(12) United States Patent
Okuyama et al.

(10) Patent No.: US 12,551,418 B2
(45) Date of Patent: Feb. 17, 2026

(54) COSMETIC CONTAINING ULTRAVIOLET WAVELENGTH CONVERTING SUBSTANCE AND MEDICINAL AGENT

(71) Applicant: Shiseido Company, Ltd., Tokyo (JP)

(72) Inventors: Yusuke Okuyama, Tokyo (JP); Kazuyuki Miyazawa, Tokyo (JP); Nobuyoshi Koga, Tokyo (JP); Tetsuya Kanemaru, Tokyo (JP); Renaud Gillet, Tokyo (JP); Bianca McCarthy, Tokyo (JP)

(73) Assignee: Shiseido Company, Ltd., Tokyo (JP)

( * ) Notice: Subject to any disclaimer, the term of this patent is extended or adjusted under 35 U.S.C. 154(b) by 1058 days.

(21) Appl. No.: 17/601,347

(22) PCT Filed: Apr. 3, 2020

(86) PCT No.: PCT/JP2020/015422
§ 371 (c)(1),
(2) Date: Oct. 4, 2021

(87) PCT Pub. No.: WO2020/204191
PCT Pub. Date: Oct. 8, 2020

(65) Prior Publication Data
US 2022/0175639 A1    Jun. 9, 2022

(30) Foreign Application Priority Data

Apr. 5, 2019   (JP) ................. 2019-072750

(51) Int. Cl.
| | |
|---|---|
| *A61K 8/27* | (2006.01) |
| *A61K 8/02* | (2006.01) |
| *A61K 8/23* | (2006.01) |
| *A61K 8/25* | (2006.01) |
| *A61K 8/29* | (2006.01) |
| *A61K 8/368* | (2006.01) |
| *A61K 8/37* | (2006.01) |
| *A61K 8/44* | (2006.01) |
| *A61K 8/49* | (2006.01) |
| *A61K 8/58* | (2006.01) |
| *A61K 8/60* | (2006.01) |
| *A61K 8/67* | (2006.01) |
| *A61K 8/73* | (2006.01) |
| *A61K 8/891* | (2006.01) |
| *A61K 8/895* | (2006.01) |
| *A61K 33/30* | (2006.01) |
| *A61K 45/06* | (2006.01) |
| *A61Q 17/04* | (2006.01) |
| *A61Q 19/00* | (2006.01) |
| *A61Q 19/08* | (2006.01) |

(52) U.S. Cl.
CPC .............. *A61K 8/27* (2013.01); *A61K 8/022* (2013.01); *A61K 8/23* (2013.01); *A61K 8/25* (2013.01); *A61K 8/29* (2013.01); *A61K 8/368* (2013.01); *A61K 8/37* (2013.01); *A61K 8/44* (2013.01); *A61K 8/4926* (2013.01); *A61K 8/585* (2013.01); *A61K 8/602* (2013.01); *A61K 8/67* (2013.01); *A61K 8/673* (2013.01); *A61K 8/73* (2013.01); *A61K 8/891* (2013.01); *A61K 8/895* (2013.01); *A61K 33/30* (2013.01); *A61K 45/06* (2013.01); *A61Q 17/04* (2013.01); *A61Q 19/00* (2013.01); *A61Q 19/08* (2013.01); *A61K 2800/434* (2013.01); *A61K 2800/48* (2013.01); *A61K 2800/614* (2013.01); *A61K 2800/805* (2013.01)

(58) Field of Classification Search
CPC . A61K 8/27; A61K 8/022; A61K 8/23; A61K 8/25; A61K 8/29; A61K 8/368; A61K 8/37; A61K 8/44; A61K 8/4926; A61K 8/585; A61K 8/602; A61K 8/67; A61K 8/673; A61K 8/73; A61K 8/891; A61K 8/895; A61K 33/30; A61K 45/06; A61K 2800/434; A61K 2800/48; A61K 2800/614; A61K 2800/805; A61K 8/8158; A61K 9/06; A61K 33/42; A61K 47/10; A61K 8/8147; A61K 31/409; A61K 38/41; A61Q 17/04; A61Q 19/00; A61Q 19/08; A61P 17/00
See application file for complete search history.

(56) References Cited

U.S. PATENT DOCUMENTS

| | | |
|---|---|---|
| 2,613,206 A | 10/1952 | Caldwell |
| 3,577,537 A | 5/1971 | Howe |
| 4,374,796 A | 2/1983 | Ogasawara et al. |
| 5,221,534 A | 6/1993 | Lauriers et al. |
| 5,316,767 A * | 5/1994 | Hara ............ A61Q 19/02 424/401 |
| 5,612,324 A | 3/1997 | Guang Lin et al. |

(Continued)

FOREIGN PATENT DOCUMENTS

| | | |
|---|---|---|
| CN | 102048654 A | 5/2011 |
| CN | 105055251 A | 11/2015 |

(Continued)

OTHER PUBLICATIONS

Feng Juqin et al., "Chinese Cosmetic Therapy Techniques," China Press of Traditional Chinese Medicine, Aug. 31, 2014, p. 35-36.

(Continued)

*Primary Examiner* — Robert A Wax
*Assistant Examiner* — Quanglong N Truong
(74) *Attorney, Agent, or Firm* — Foley & Lardner LLP

(57) ABSTRACT

Provided is a novel cosmetic containing: an ultraviolet wavelength conversion substance and a drug.

6 Claims, 5 Drawing Sheets

(56) References Cited

U.S. PATENT DOCUMENTS

| | | | |
|---|---|---|---|
| 5,998,789 A | 12/1999 | Kovalsky et al. | |
| 6,207,174 B1 | 3/2001 | Hineno et al. | |
| 6,972,129 B1 | 12/2005 | Ogawa et al. | |
| 2002/0106518 A1 | 8/2002 | Inaki et al. | |
| 2003/0180535 A1 | 9/2003 | Horino et al. | |
| 2005/0158257 A1 | 7/2005 | Ogawa et al. | |
| 2006/0140889 A1 | 6/2006 | Houtzager et al. | |
| 2006/0275231 A1 | 12/2006 | Dumousseaux | |
| 2007/0141018 A1 | 6/2007 | Courtois et al. | |
| 2007/0154426 A1 | 7/2007 | Hansen et al. | |
| 2007/0243520 A1 | 10/2007 | Fujimura et al. | |
| 2008/0183250 A1 | 7/2008 | Tanojo et al. | |
| 2008/0213198 A1* | 9/2008 | Lintner | A61K 8/64 514/2.3 |
| 2009/0220627 A1 | 9/2009 | Hasegawa et al. | |
| 2009/0270298 A1 | 10/2009 | Compain | |
| 2010/0003202 A1* | 1/2010 | Matsumoto | C09C 3/10 424/59 |
| 2010/0228181 A1 | 9/2010 | Laboureau et al. | |
| 2010/0247693 A1 | 9/2010 | Marini | |
| 2010/0272663 A1 | 10/2010 | Pierre et al. | |
| 2011/0033400 A1 | 2/2011 | Ehlis et al. | |
| 2011/0046538 A1 | 2/2011 | Laboureau et al. | |
| 2012/0156149 A1 | 6/2012 | Yamaguchi et al. | |
| 2012/0328719 A1* | 12/2012 | Iriyama | A61P 17/02 424/730 |
| 2013/0079368 A1* | 3/2013 | Omura | A61Q 19/007 514/315 |
| 2015/0239941 A1 | 8/2015 | Ecosystem | |
| 2016/0160347 A1 | 6/2016 | Liu et al. | |
| 2016/0338943 A1 | 11/2016 | Saxena et al. | |
| 2017/0009024 A1 | 1/2017 | Kudo | |
| 2017/0027827 A1 | 2/2017 | Ota et al. | |
| 2017/0042312 A1 | 2/2017 | Shih | |
| 2017/0065498 A1* | 3/2017 | Gershon | A61K 8/27 |
| 2017/0172888 A1 | 6/2017 | Tashiro et al. | |
| 2018/0311117 A1* | 11/2018 | Zeng | A61K 8/8117 |
| 2020/0093712 A1 | 3/2020 | Uchiyama et al. | |
| 2020/0113793 A1 | 4/2020 | Sako et al. | |
| 2020/0289400 A1 | 9/2020 | Nakajima et al. | |
| 2020/0297598 A1 | 9/2020 | Koizumi et al. | |
| 2020/0308482 A1 | 10/2020 | Ishikawa et al. | |
| 2021/0228472 A1 | 7/2021 | Osawa et al. | |
| 2022/0175639 A1 | 6/2022 | Okuyama et al. | |

FOREIGN PATENT DOCUMENTS

| | | |
|---|---|---|
| CN | 106309272 A | 1/2017 |
| CN | 105055251 B1 | 6/2018 |
| CN | 113631144 A | 11/2021 |
| EP | 0 905 206 A2 | 3/1999 |
| EP | 1 090 974 A1 | 4/2001 |
| EP | 1 296 639 A1 | 4/2003 |
| GB | 0 639 086 A | 6/1950 |
| JP | 57-060004 B2 | 12/1982 |
| JP | 61-054766 B2 | 11/1986 |
| JP | 62-000408 A | 1/1987 |
| JP | 03-284613 A | 12/1991 |
| JP | 05-117127 A | 5/1993 |
| JP | 07-206651 A | 8/1995 |
| JP | 09-030926 A | 2/1997 |
| JP | 10-265321 A | 10/1998 |
| JP | 11-092688 A | 4/1999 |
| JP | 11-193207 A | 7/1999 |
| JP | 11-222421 A | 8/1999 |
| JP | 11-236315 A | 8/1999 |
| JP | 2001-335442 A | 12/2001 |
| JP | 2002-146238 A | 5/2002 |
| JP | 2002-212033 A | 7/2002 |
| JP | 3303942 B | 7/2002 |
| JP | 2003-061229 A | 2/2003 |
| JP | 2003-212745 A | 7/2003 |
| JP | 2003-261421 A | 9/2003 |
| JP | 3608778 B2 | 1/2005 |
| JP | 2005-041861 A | 2/2005 |
| JP | 2006-022050 A | 1/2006 |
| JP | 2006-282593 A | 10/2006 |
| JP | 2006-316065 A | 11/2006 |
| JP | 2007-055990 A | 3/2007 |
| JP | 2007-056035 A | 3/2007 |
| JP | 2007-084508 A | 4/2007 |
| JP | 2007-517770 A | 7/2007 |
| JP | 2008-037844 A | 2/2008 |
| JP | 4048420 B | 2/2008 |
| JP | 2008-189642 A | 8/2008 |
| JP | 2009-137900 A | 6/2009 |
| JP | 2009-209093 A | 9/2009 |
| JP | 2010-090113 A | 4/2010 |
| JP | 4453995 B2 | 4/2010 |
| JP | 2010-195694 A | 9/2010 |
| JP | 2010-533689 A | 10/2010 |
| JP | 2011-042624 A | 3/2011 |
| JP | 4677250 B | 4/2011 |
| JP | 2011-102270 A | 5/2011 |
| JP | 2012-167088 A | 9/2012 |
| JP | 2012-201660 A | 10/2012 |
| JP | 2013-501104 A | 1/2013 |
| JP | 2013-177356 A | 9/2013 |
| JP | 2015-074623 A | 4/2015 |
| JP | 2015-120682 A | 7/2015 |
| JP | 2015-172017 A | 10/2015 |
| JP | 2016-500052 A | 1/2016 |
| JP | 2016-069325 A | 5/2016 |
| JP | 2017-036277 A | 2/2017 |
| JP | 2017-088719 A | 5/2017 |
| JP | 2017-122075 A | 7/2017 |
| JP | 2017-122076 A | 7/2017 |
| JP | 2017-155062 A | 9/2017 |
| JP | 2017-214565 A | 12/2017 |
| JP | 2018-076277 A | 5/2018 |
| JP | 2018-076308 A | 5/2018 |
| JP | 2018-512064 A | 5/2018 |
| JP | 2018-100258 A | 6/2018 |
| JP | 6361416 B | 7/2018 |
| JP | 2018-131422 A | 8/2018 |
| JP | 6424656 B2 | 11/2018 |
| JP | 2019-043920 A | 3/2019 |
| JP | 2019-108303 A | 7/2019 |
| JP | 2019-137623 A | 8/2019 |
| JP | 2019-167330 A | 10/2019 |
| JP | 2019-178126 A | 10/2019 |
| JP | 2020-066599 A | 4/2020 |
| JP | 2020-183356 A | 11/2020 |
| KR | 10-2019-0005369 A | 1/2019 |
| TW | 201216997 A1 | 5/2012 |
| WO | WO-02/00190 A1 | 1/2002 |
| WO | WO-03/099039 A1 | 12/2003 |
| WO | WO-2005/034862 A2 | 4/2005 |
| WO | WO-2011/014783 A1 | 2/2011 |
| WO | WO-2015/166895 A1 | 11/2015 |
| WO | WO-2016/068300 A1 | 5/2016 |
| WO | WO-2016/142129 | 9/2016 |
| WO | WO-2016/160347 A2 | 10/2016 |
| WO | WO-2017/069157 A1 | 4/2017 |
| WO | WO-2017/142057 A1 | 8/2017 |
| WO | WO-2018/004006 A1 | 1/2018 |
| WO | WO-2018/062469 A1 | 4/2018 |
| WO | WO-2018/117117 A1 | 6/2018 |
| WO | WO-2019/032059 A1 | 2/2019 |
| WO | WO-2019/065963 A1 | 4/2019 |

OTHER PUBLICATIONS

Zhu Ping et al., "LED Light Therapy Application and Development," China Science and Technology Press, Aug. 31, 2017, p. 41.
U.S. Appl. No. 17/796,577, filed Jan. 29, 2021, Miyazawa et al.
U.S. Appl. No. 17/796,578, filed Jan. 29, 2021, Miyazawa et al.
U.S. Appl. No. 17/796,580, filed Jan. 29, 2021, Miyazawa et al.
U.S. Appl. No. 17/796,584, filed Jan. 29, 2021, Miyazawa et al.
Kato, Toshimitsu, "Utilization of Spirulina blue colorant: Especially for frozen desserts and drinks," New Food Industry, 1987, 29(3):17-21, with English machine translation.

(56) References Cited

OTHER PUBLICATIONS

Sakai Chemical Industry Co., Ltd., "Shining new cosmetic raw material, Inorganic fluorescent powder LUMATE series," Fragrance Journal, Jul. 2015, 62-63, with English machine translation.
Sakai Chemical Industry Co., Ltd., Inorganic fluorescent material that emits "beautiful skin color", Lumate, Fragrance Journal, 2018, 46(8):66-67, with English translation.
U.S. Appl. No. 17/601,252, filed Apr. 3, 2020, Ito et al.
U.S. Appl. No. 17/601,262, filed Apr. 3, 2020, Yoshida et al.
U.S. Appl. No. 17/601,333, filed Apr. 3, 2020, Sugihara et al.
U.S. Appl. No. 17/601,317, filed Apr. 3, 2020, Ito et al.
U.S. Appl. No. 17/601,331, filed Apr. 3, 2020, Okuyama et al.
U.S. Appl. No. 17/601,341, filed Apr. 1, 2020, Miyazawa et al.
U.S. Appl. No. 17/601,704, filed Apr. 3, 2020, Ito et al.
"Modern Cosmetic Science and Technology (vol. 2)," edited by Qiu Bingyi et al., China Light Industry Press Ltd., Mar. 2016, pp. 1414 and 1415, with English machine translation.
Du et al., "Visible-to-Ultraviolet Light Conversion: Materials and Applications," Advanced Photonics Research, 2021, 2(2000213):1-20.
Eriksen, Niels T., "Production of phycocyanin—a pigment with applications in biology, biotechnology, foods and medicine," Applied Microbiology and Biotechnology, 2008, 80(1):1-14.
Hatano et al., "Monolithic wavelength converter for ultraviolet light by use of a GdxY1-xCa4O(BO3)3 crystal," Applied Optics, Dec. 10, 2005, 44(35):7651-7658.
Hui et al., "Study on Fluorescence Spectra of B Vitamins," International Conference on Mechanics, Materials and Structural Engineering (ICMMSE 2016), 160-165.
Invitrogen, Phycobiliproteins, 2009, 6 pages.
Jeong et al., "Self-Assembling Nanospheres of Hydrophobized Pullulans in Water," Drug Development and Industrial Pharmacy, 1999, 25(8):917-927.
Ling et al., "Home Physical Therapy for Common Diseases," Heilongjiang Science and Technology Press, 1st Ed., Jan. 2002, 97-98, with English machine translation.
Machine translation of WO 2018004006A1, (Year: 2018) 28 pages.
Translation of Kawai et al. WO2017142057. Published Aug. 24, 2017. Human-assisted machine translation by STIC Translation Service Center provided to the USPTO. Provided on Sep. 12, 2024. (Year: 2017).
Translation of Yumiko et al. WO2017142057. Published Aug. 24, 2017. Human-assisted machine translation by STIC Translation Service Center provided to the USPTO. Provided on Sep. 12, 2024. (Year:2017).
Vinck et al., "Increased fibroblast proliferation induced by light emitting diode and low power laser irradiation," Lasers Med. Sci., 2003, 18:95-99.
Dejsungkranont et al., "Enhancement of antioxidant activity of C-phycocyanin of Spirulina powder treated with supercritical fluid carbon dioxide," Agriculture and Natural Resources, 2017, 51:347-354.
Estrada-Urbina et al., "Nanoscale Zinc Oxide Particles for Improving the Physiological and Sanitary Quality of a Mexican Landrace of Red Maize." Nanomaterials, Apr. 17, 2018, 8(247): 1-12.
Tsai et al., "Dispersion of Titanium Oxide Nanoparticles in Aqueous Solution with Anionic Stabilizer via Ultrasonic Wave," Journal of Nanoparticles, Nov. 24, 2016, vol. 2016; Article ID 6539581, 1-9.
Wang et al., "Photoprotection in the Era of Nanotechnology," Seminars in Cutaneous Medicine and Surgery, Dec. 2011, 30(4):210-213.
WO-2017142057-A1 translation, Aug. 27, 2017, 25 pages.

\* cited by examiner

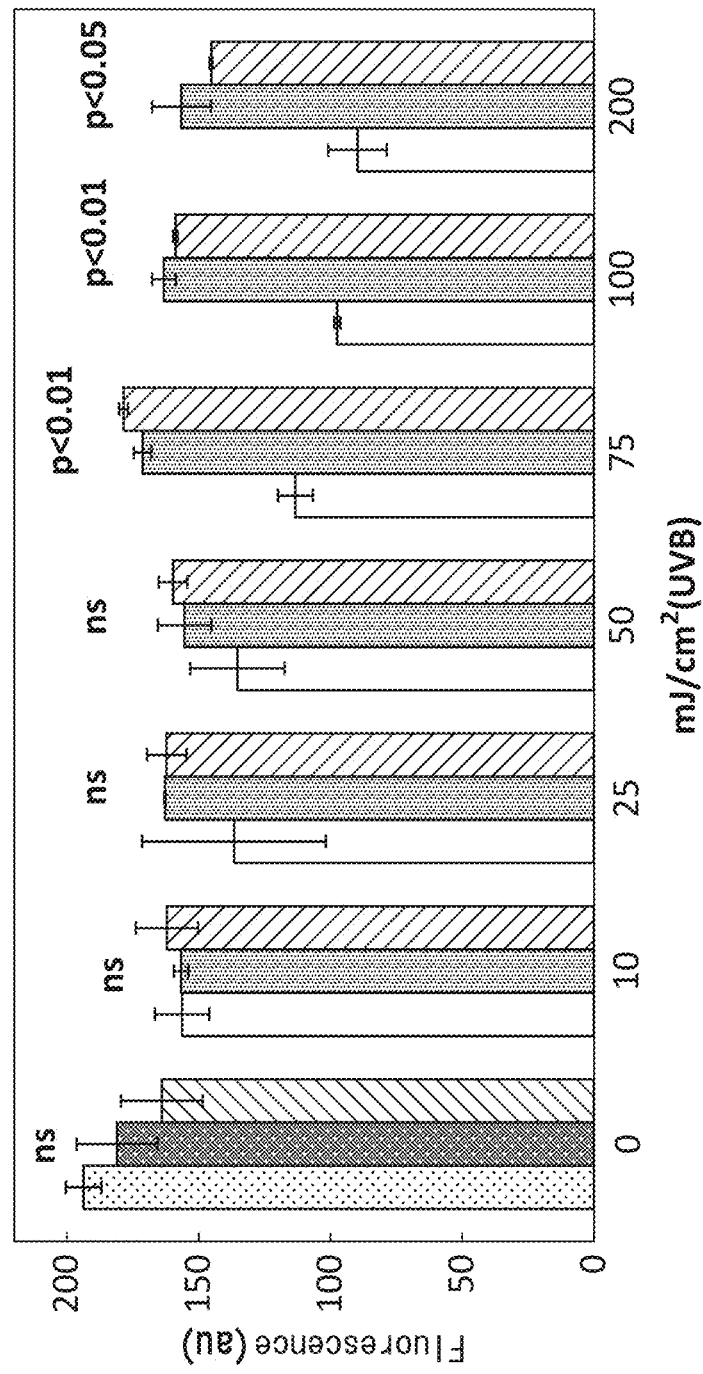

COSMETIC CONTAINING ULTRAVIOLET WAVELENGTH CONVERTING SUBSTANCE AND MEDICINAL AGENT

CROSS-REFERENCE TO RELATED APPLICATIONS

This application is the U.S. National Stage of PCT/JP2020/015422, filed Apr. 3, 2020, which claims priority to JP 2019-072750, filed Apr. 5, 2019.

FIELD

The present invention relates to a cosmetic having a cell activation action and comprising a UV wavelength conversion substance and a drug.

BACKGROUND

Ultraviolet is considered to generate free radicals in vivo and thereby cause oxidation of sebum and damage to cellular DNA. Examples of the damage caused by ultraviolet to skin include adverse effects such as skin cancer, photoaging, spot, wrinkles, and inflammation. These are undesirable from a health and beauty perspective. Although ultraviolet has been used for the purpose of sterilization, it is currently focused on protection from rather than active use of ultraviolet in consideration of the balance with harmful effects caused by ultraviolet.

Thus, many measures have been taken to protect skin from ultraviolet. Examples thereof include use of sunscreens, indoor activities avoiding sunlight, use of UV-cut hats or clothing, and ultraviolet cut films.

For example, PTL 12 describes a cosmetic containing a fluorescent zinc oxide but not containing the drug according to the present invention. PTL 12 does not describe a UV wavelength conversion substance for bringing about a cell activation effect.

CITATION LIST

Patent Literature

[PTL 1] Japanese Registered Patent Publication No. 6424656
[PTL 2] Japanese Registered Patent Publication No. 6361416
[PTL 3] WO 2018/004006
[PTL 4] Japanese Unexamined Patent Publication (Kokai) No. 2018-131422
[PTL 5] Japanese Unexamined Patent Publication (Kokai) No. 5-117127
[PTL 6] Japanese Registered Patent Publication No. 4048420
[PTL 7] Japanese Registered Patent Publication No. 4677250
[PTL 8] Japanese Registered Patent Publication No. 3303942
[PTL 9] Japanese Unexamined Patent Publication (Kokai) No. 2017-88719
[PTL 10] WO 2018/117117
[PTL 11] Japanese Unexamined Patent Publication (Kokai) No. 2015-120682
[PTL 12] Japanese Unexamined Patent Publication (Kokai) No. 3-284613

SUMMARY

Technical Problem

An object of the present invention is to provide a novel cosmetic having a cell activation action utilizing ultraviolet.

Solution to Problem

The present inventors have conducted intensive studies so that ultraviolet can be effectively used for skin. As a result, the present inventors have conceived of a cosmetic having an excellent cell activation action and containing a UV wavelength conversion substance and a drug.

The present application provides the following inventions.

(1) A cosmetic comprising
(A) a UV wavelength conversion substance and
(B) one or more drugs selected from the group of glycyrrhizic acid and a derivative thereof, nicotinic acid and a derivative thereof, tranexamic acid and a derivative thereof, salicylic acid and a derivative thereof, and a carboxylic acid represented by formula (I) below, and salts thereof.

[Chem. 1]

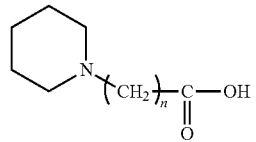

(I)

wherein n represents an integer of 2 to 5.

(2) The cosmetic according to (1), wherein the (A) UV wavelength conversion substance comprises an inorganic UV wavelength conversion substance.
(3) The cosmetic according to (2), wherein the inorganic UV wavelength conversion substance comprises a zinc oxide phosphor and/or a magnesium titanate phosphor.
(4) The cosmetic according to any one of (1) to (3), wherein the (A) UV wavelength conversion substance comprises an organic UV wavelength conversion substance.
(5) The cosmetic according to (4), wherein the organic UV wavelength conversion substance comprises one or more selected from the group of:
phycobiliproteins such as phycocyanin, phycoerythrocyanin, and phycoerythrin; natural or synthetic components such as vitamin A, β-carotene, vitamin K, vitamin B1, vitamin B2, vitamin B2 derivatives, vitamin B6, vitamin B12, folic acid, lycopene, gardenia color, capsicum color, capsicum extract, paprika color, safflower color, turmeric color, cochineal color, perilla color, red cabbage color, flavonoid, carotenoid, quinoid, porphyrins, anthocyanins, and polyphenols; Red No. 401, Red No. 227, Red No. 504, Red No. 218, Orange No. 205P, Yellow No. 4, Yellow No. 5, Green No. 201, pyranine conc., Blue No. 1, 2,4-diaminophenoxyethanol hydrochloride, Alizuline Purple SS, Purple No. 401, Black No. 401, Helindon Pink, Yellow No. 401, Benzidine Yellow G, Blue No. 404, Red No. 104, and meta-aminophenol.

(6) A cosmetic comprising
(A') one or more substances selected from the group of: phycobiliproteins such as phycocyanin, phycoerythrocyanin, and phycoerythrin; natural or synthetic components such as vitamin A, β-carotene, vitamin K, vitamin B1, vitamin B2, vitamin B2 derivatives, vitamin B6, vitamin B12, folic acid, lycopene, gardenia color, capsicum color, capsicum extract, paprika color, safflower color, turmeric color, cochineal color, perilla color, red cabbage color, flavonoid, carotenoid, quinoid, porphyrins, anthocyanins, and polyphenols; Red No. 401, Red No. 227, Red No. 504, Red No. 218, Orange No. 205P, Yellow No. 4, Yellow No. 5, Green No. 201, pyranine conc., Blue No. 1, 2,4-diaminophenoxyethanol hydrochloride, Alizuline Purple SS, Purple No. 401, Black No. 401, Helindon Pink, Yellow No. 401, Benzidine Yellow G, Blue No. 404, Red No. 104, meta-aminophenol, a zinc oxide phosphor, and a magnesium titanate phosphor, and
(B) one or more drugs selected from the group of glycyrrhizic acid and a derivative thereof, nicotinic acid and a derivative thereof, tranexamic acid and a derivative thereof, salicylic acid and a derivative thereof, and a carboxylic acid represented by the formula (I), and salts thereof.
(7) The cosmetic according to any one of (1) to (6), wherein a salt of the glycyrrhizic acid comprises dipotassium glycyrrhizinate.
(8) The cosmetic according to any one of (1) to (7), wherein a derivative of the nicotinic acid comprises a nicotinic acid amide.
(9) The cosmetic according to any one of (1) to (8), wherein the tranexamic acid or a derivative thereof comprises tranexamic acid.
(10) The cosmetic according to any one of (1) to (9), wherein a salt of a derivative of the salicylic acid comprises potassium 4-methoxysalicylate.
(11) The cosmetic according to any one of (1) to (10), wherein the carboxylic acid represented by the formula (I) comprises 1-piperidine propionic acid.
(12) The cosmetic according to any one of (1) to (11), which is a lotion, a cosmetic cream, or a cosmetic emulsion.
(13) The cosmetic according to any one of (1) to (12), which exhibits a fluorescence intensity increasing effect.
(14) The cosmetic according to any one of (1) to (13), which exhibits a cell activation effect.

Advantageous Effects of Invention

The UV wavelength conversion substance of the present invention is suitable for effectively utilizing ultraviolet to activate skin cells. The constituent composition of the cosmetic of the present invention is suitable so that the UV wavelength conversion substance converts ultraviolet to visible light. Conventionally, since ultraviolet is not preferable for skin, it is a technical common knowledge in this field to take measures to avoid exposing skin to ultraviolet as much as possible. However, the present invention is based on the knowledge that conversely a UV wavelength conversion substance utilizes ultraviolet to activate cells and thereby provide a preferable action on skin, and is very surprising. Further, the drug contained in the cosmetic of the present invention is not only effective for rough skin and whitening, but also increases the function of the UV wavelength conversion substance. Thus, the cosmetic of the present invention may lead to an improvement in the quality of life, such that even those who have avoided ultraviolet as much as possible for a reason of beauty or health may feel like going out actively.

BRIEF DESCRIPTION OF DRAWINGS

FIG. 5 shows the cell activity when irradiating cells having cell activity temporarily reduced in Experiment 3 with UV using C-phycocyanin as relative fluorescence intensity (au) (P test).

DESCRIPTION OF EMBODIMENTS

Figure 1:
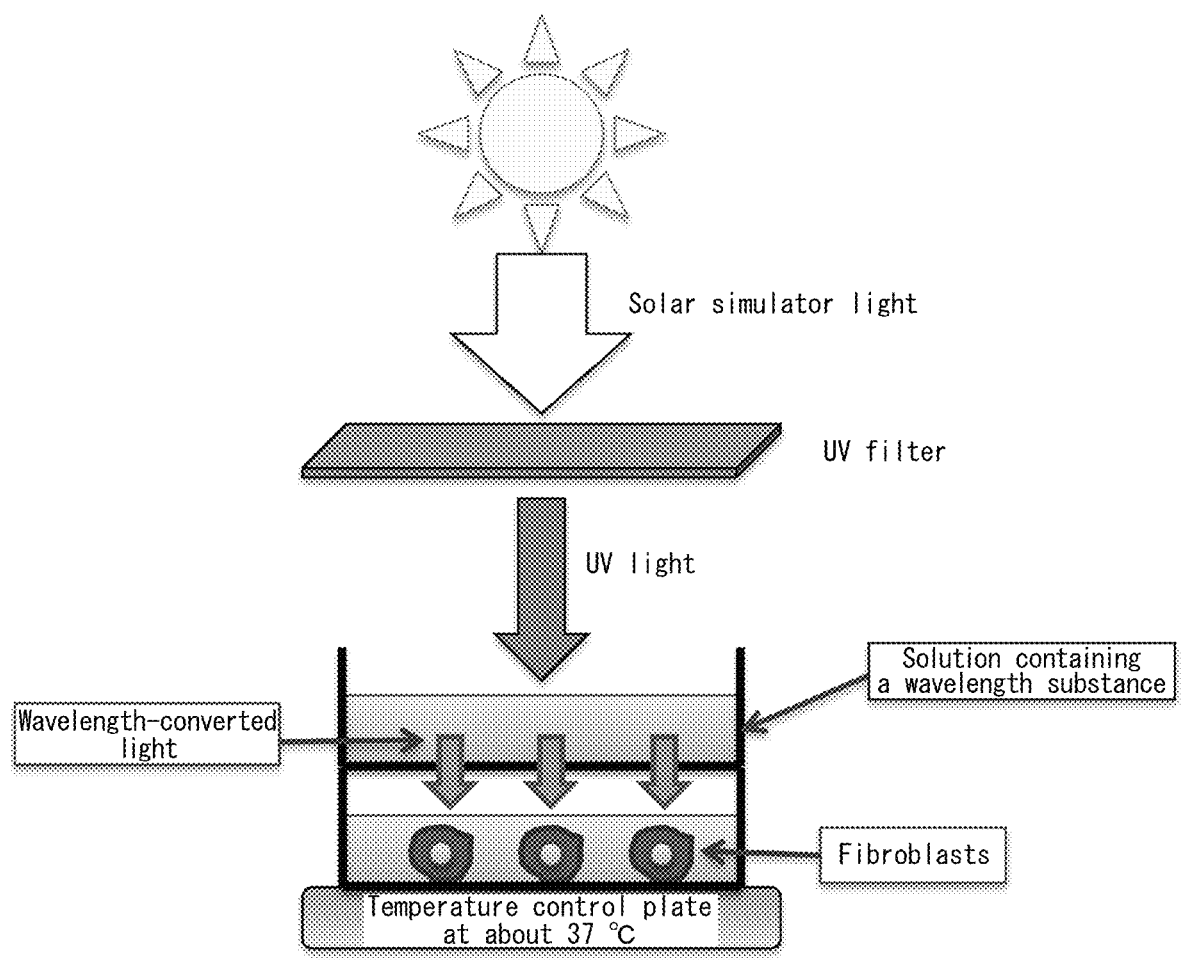
FIG. 1 is a schematic diagram of Experiments 1 and 2.

The present invention will be described below in detail with reference to specific embodiments. However, the present invention is not limited to the following embodiments, and can be carried out in any embodiments without departing from the spirit of the present invention.

All of the patent publications, unexamined patent publications, and non-patent literature cited in the present disclosure are incorporated by reference in their entirety into the present disclosure for all purposes.

In the present disclosure, "to" when applied to numerical values refers to a range of values that fall within a range that is greater than or equal to a defined reference value and less than or equal to a defined reference value.
(a) UV Wavelength Conversion Substance The cosmetic of the present invention contains a UV wavelength conversion substance as an active component. The phrase "UV wavelength conversion substance" refers to a substance which converts the wavelength of ultraviolet contained in incident light to outgoing light with a wavelength longer than the wavelength of ultraviolet. The phrase "organic UV wavelength conversion substance" refers to a UV wavelength conversion substance which is an organic compound, and the phrase "inorganic UV wavelength conversion substance" refers to a UV wavelength conversion substance which is an inorganic compound.

The ultraviolet may contain UVA, UVB, or UVC. In one embodiment, the ultraviolet is light having a peak wavelength of 200 nm to 400 nm. Further, incident light, for example, sunlight, may contain ultraviolet. Furthermore, the incident light may be ultraviolet or artificially generated ultraviolet may be used.

The outgoing light emitted from the UV wavelength conversion substance has a longer wavelength than ultraviolet and has a peak wavelength of preferably 500 nm to 700 nm. The outgoing light may have one or more peaks, for example, but not limited to, at 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, or within any range therebetween or may be red light, orange light, green light, or blue light. In one embodiment, the main wavelength exhibited by the light emitted from the UV wavelength conversion substance when excited by 200 nm to 400 nm excitation light is 500 nm to 700 nm.

Examples of the UV wavelength conversion substance include the following components: phycobiliproteins such as phycocyanin (allophycocyanin, C-phycocyanin, R-phycocyanin), phycoerythrocyanin, and phycoerythrin (B-phycoerythrin, b-phycoerythrin, C-phycoerythrin, R-phycoerythrin); natural or synthetic components such as vitamin A, β-carotene, vitamin K, vitamin B1, vitamin B2, vitamin B6, vitamin B12, folic acid, lycopene, capsicum extract, capsicum color, paprika color, gardenia color, safflower color, turmeric color, cochineal color, perilla color, red cabbage color, flavonoid, carotenoid, quinoid, porphyrins, anthocyanins, and polyphenols; colors such as Red No. 401, Red No. 227, Red No. 504, Red No. 218, Orange No. 205P, Yellow No. 4, Yellow No. 5, Green No. 201, pyranine conc., Blue No. 1, 2,4-diaminophenoxyethanol hydrochloride, Alizuline Purple SS, Purple No. 401, Black No. 401, Helindon Pink, Yellow No. 401, Benzidine Yellow G, Blue No. 404, Red No. 104, and meta-aminophenol; phosphors of an inorganic compound doped to exhibit a fluorescence property, such as the blue phosphor containing an amorphous silica particle, cerium, and phosphorus and/or magnesium described in Japanese Registered Patent Publication No. 6424656, the red phosphor containing a europium-activated compound of a mixed crystal of an alkaline earth metal sulfide and a gallium compound described in Japanese Registered Patent Publication No. 6361416, the zinc oxide phosphor described in WO 2018/004006, the zinc oxide phosphor described in Japanese Unexamined Patent Publication (Kokai) No. 2018-131422, the inorganic phosphor described in Japanese Unexamined Patent Publication (Kokai) No. 5-117127 (hereinafter, a phosphor derived from zinc oxide is referred to as a "zinc oxide phosphor"). In one embodiment, the inorganic phosphor is one or more phosphors selected from phosphors of zinc oxide represented by ZnO:Zn, $Zn_{1+z}$, or $ZnO_{1-x}$, doped with a sulfide and/or a sulfate, such as zinc sulfide and zinc sulfate, described in WO 2018/004006, magnesium titanate phosphors of a magnesium titanate such as $MgTiO_3$ or $Mg_2TiO_4$ doped with manganese (hereinafter, a phosphor derived from magnesium titanate is referred to as a "magnesium titanate phosphor"), and calcium phosphate phosphors of a calcium phosphate such as $Ca(H_2PO_4)_2$, $CaHPO_4$, or $Ca_3(PO_4)_2$ doped with cerium.

Further, the inorganic UV wavelength conversion substance which is an inorganic phosphor may be subjected to a surface treatment. Examples of the surface treatment include a silane compound treatment (octyltriethoxysilane), a silicone compound treatment, a fluorine-modified silicone compound treatment, a fluorine compound treatment, a higher fatty acid treatment (stearic acid), a higher alcohol treatment, a fatty acid ester treatment, a metal soap treatment, an amino acid treatment, and an alkyl phosphate treatment.

The UV wavelength conversion substance may be obtained by a method of extraction from natural products such as animals, plants, and algae or an artificial method such as chemical synthesis. For example, phycobiliproteins may be prepared from blue-green algae such as Spirulina platensis, red algae such as Porphyridium cruentum, and other algae by the extraction method described in, for example, Japanese Registered Patent Publication No. 4048420, Japanese Registered Patent Publication No. 4677250, or Japanese Registered Patent Publication No. 3303942. Zinc oxide phosphors may be produced by the method described in, for example, WO 2018/004006, Japanese Unexamined Patent Publication (Kokai) No. 2018-131422, or Japanese Unexamined Patent Publication (Kokai) No. 5-117127. Magnesium titanate phosphors may be produced by the method described in Japanese Unexamined Patent Publication (Kokai) No. 2017-88719. Calcium phosphate phosphors may be produced by the method described in WO 2018/117117.

These UV wavelength conversion substances may consist of or contain these exemplified components, which may be used alone or in combination of two or more, as long as the wavelength conversion effect of the invention is not impaired. For example, to the phycobiliprotein or inorganic phosphor, there may be added another wavelength conversion substance such as vitamin B (vitamin B1, vitamin B2, vitamin B6, or vitamin B12) to aim for a synergistic effect. Note that these components are merely examples and any substance which can bring about a wavelength conversion effect can be used in the present invention.

Any derivative of vitamin B2, which is a UV wavelength conversion substance, may be used as long as the derivative is a UV wavelength conversion substance. Examples of the vitamin B2 derivatives include riboflavin acetate ester, riboflavin butyrate, riboflavin phosphate (may be a sodium or mono-diethanolamine salt), flavin mononucleotide, flavin adenine dinucleotide, riboflavin tetrabutyrate, and riboflavin tetranicotinate. Derivatives of lixoflavin, which is a stereoisomer of riboflavin, may be used.

The content of the UV wavelength conversion substance in the cosmetic of the present invention is not particularly limited as long as the wavelength conversion effect of the present invention is not impaired. The content can be appropriately determined in accordance with the type of the UV wavelength conversion substance or the application of the cosmetic containing the UV wavelength conversion substance. The range thereof is not limited and may be, for example, 0.01 to 99.99% by weight or 0.1% to 99.9% by weight.

As one aspect of the present invention, the UV wavelength conversion substance of the cosmetic contains a zinc oxide phosphor. In the cosmetic of the present invention, preferably, the content of a zinc oxide phosphor relative to the total of the cosmetic is 0.1% by weight or more, preferably 0.5% by mass or more, or more preferably 1.0% by weight or more, and 20% by weight or less, preferably 15% by weight or less, more preferably 10% by weight or less, or even more preferably 5% by weight or less. The content relative to the total of the cosmetic is 0.01 to 99.99% by weight, 0.1 to 99.9% by weight, 0.1 to 50% by weight, 0.1 to 40% by weight, 0.1 to 30% by weight, 0.1 to 20% by weight, 0.1 to 10% by weight, or 1 to 10% by weight.

As one aspect of the present invention, the UV wavelength conversion substance of the cosmetic contains a magnesium titanate phosphor. In the cosmetic of the present invention, preferably, the content of a magnesium titanate phosphor relative to the total of the cosmetic is 0.1% by weight or more, preferably 0.5% by mass or more, or more preferably 1.0% by weight or more, and 20% by weight or less, preferably 15% by weight or less, more preferably 10% by weight or less, or even more preferably 5% by weight or less. The content relative to the total of the cosmetic is 0.01 to 99.99% by weight, 0.1 to 99.9% by weight, 0.1 to 50% by weight, 0.1 to 40% by weight, 0.1 to 30% by weight, 0.1 to 20% by weight, 0.1 to 10% by weight, 0.5 to 10% by weight, or 1 to 10% by weight.

As one aspect of the present invention, the UV wavelength conversion substance of the cosmetic contains phycocyanin. In the cosmetic of the present invention, preferably, the content of a phycocyanin relative to the total of the cosmetic is 0.00001% by weight or more, preferably 0.0001% by mass or more, and 20% by weight or less, preferably 15% by weight or less, more preferably 10% by weight or less, or even more preferably 5% by weight or less. The content relative to the total of the cosmetic is 0.00001 to 99.99% by weight, 0.0001 to 99.9% by weight, 0.0001 to 50% by weight, 0.0001 to 40% by weight, 0.0001 to 30% by weight, 0.0001 to 20% by weight, 0.0001 to 10% by weight, 0.0001 to 5% by weight, 0.001 to 5% by weight, 0.01 to 5% by weight, 0.05 to 5% by weight, 0.1 to 5% by weight, 0.1 to 3% by weight, or 0.1 to 1% by weight.

As one aspect of the present invention, the UV wavelength conversion substance of the cosmetic contains vitamin B2. In the cosmetic of the present invention, preferably, the content of vitamin B2 relative to the total of the cosmetic is 0.00001% by weight or more, preferably 0.0001% by weight or more, and 20% by weight or less, preferably 15% by weight or less, more preferably 10% by weight or less, or even more preferably 5% by weight or less. The content relative to the total of the cosmetic is 0.00001 to 99.99% by weight, 0.0001 to 99.9% by weight, 0.0001 to 50% by weight, 0.0001 to 40% by weight, 0.0001 to 30% by weight, 0.0001 to 20% by weight, 0.0001 to 10% by weight, 0.0001 to 5% by weight, 0.001 to 5% by weight, 0.005 to 5% by weight, 0.01 to 5% by weight, 0.01 to 1% by weight, 0.01 to 0.5% by weight, or 0.01 to 0.1% by weight.

Examples of cell activation include, but are not limited to, promoting metabolism and turnover, improving a function, promoting proliferation, inhibiting oxidation, improving resistance to fatigue and external stimuli, and inhibiting loss of function and activity in cells, such as dermal fibroblasts and/or keratinocytes, of animals including humans. When skin cells are activated, effects such as prevention of or improvement from wrinkles, spots, skin aging, and photoaging can be expected. When scalp cells are activated, effects such as improvement in hair tension and elasticity, inhibition of hair loss, and promotion of hair growth can be expected as well.

The cell activation effect may be measured by measuring, for example, the viability, reducing ability, or proliferation of living cells using AlamarBlue as in the Examples. Any method can be used such as another dye assay, mitochondrial membrane potential-dependent dye assay, intracellular cytochrome c assay, elastase cleavage dye assay, ATP, ADE assay, glycolytic flux and oxygen consumption assay, collagen assay, photoaging assay, collagen glycation assay, inflammatory substances (interleukin 1α, interleukin 8, tumor necrosis factor α) assay, skin barrier function-related protein (corneodesmosin, sphingomyelin phosphodiesterase, filaggrin, involucrin, loricrin, transglutaminase 1, caspase 14) assay, angiogenesis modulator (VEGF-A, ANGPT1) assay, oxidation and/or skin stress-related protein (aromatic hydrocarbon receptor repressor, cytochrome P4501B1, aromatic hydrocarbon receptor repressor, heme oxygenase 1) assay, or hyaluronic acid assay.

The cosmetic of the present invention is suitable for performing the function of a UV wavelength conversion substance and for alleviating, or more positively improving or restoring skin damage during and after ultraviolet irradiation by activating cells, and more specifically, is suitable for collagen production or hyaluronic acid production by fibroblasts and inhibition of damage caused by photoaging and for inhibiting oxidation stress of keratinocytes, enhancing a barrier function, inhibiting an inflammatory reaction, and inhibiting the glycation of collagen and angiogenesis in skin.

Fluorescence intensity can be measured using a spectrofluorometer by irradiating with ultraviolet a coating film of the cosmetic on the surface of a substrate, as in the Examples. The substrate may be a resin substrate composed of a polymethyl methacrylate (PMMA), nylon, or acrylic plate or an inorganic plate of glass or quartz. For example, a PMMA plate having V-shaped grooves on its surface (also refer to as "S plate": Japanese Registered Patent Publication No. 4453995) can be used. As the fluorescence intensity, a fluorescence value at a specific single wavelength or an integrated value in a specific wavelength region may be used.

(B) Drug

The cosmetic of the present invention contains a drug. The term "drug" in the present invention refers to a drug effective for improving rough skin and/or wrinkles and/or whitening when used on skin. Examples of the drug include drugs that increase the function of the UV wavelength conversion substance with the following compounds or salts thereof:

glycyrrhizic acid and glycyrrhizic acid derivatives; nicotinic acid and nicotinic acid derivatives (nicotinic acid amides, nicotinic acid esters (tocopherol nicotinate, benzyl nicotinate, methyl nicotinate, ethyl nicotinate)); tranexamic acid and tranexamic acid derivatives (dimers (trans-4-(trans-4-aminomethylcyclohexanecarbonyl)aminomethylcyclohexane carboxylate hydrochloride) of tranexamic acid, esters (trans-4-aminomethylcyclohexane carboxylate 4'-hydroxyphenyl ester) of tranexamic acid and hydroquinone, esters (2-(trans-4-aminomethylcyclohexylcarbonyloxy)-5-hydroxybenzoic acid) of tranexamic acid and gentisic acid, cetyl tranexamate, amides (trans-4-aminomethylcyclohexane carboxylate methylamide, trans-4-acetylaminomethylcyclohexane carboxylic acid, trans-4-(p-methoxybenzoyl)aminomethylcyclohexane carboxylic acid and salts thereof, trans-4-guanidinometylcyclohexane carboxylic acid and salts thereof) of tranexamic acid; derivatives of salicylic acids such as 4-methoxysalicylic acid; and carboxylic acids having a piperidine ring such as 1-piperidine propionic acid, 4-piperidinobutyric acid, piperidine-1-valeric acid, and piperidine-1-caproic acid.

The drug contained in the cosmetic of the present invention may be a salt, and is not particularly limited as long as the function of the UV wavelength conversion substance is increased. Examples thereof include a sodium salt, a potassium salt, an ammonium salt, a magnesium salt, and a calcium salt.

The salt of glycyrrhizic acid or a derivative thereof used in the cosmetic of the present invention is not particularly limited as long as the salt is commonly used in cosmetics, for example, dipotassium glycyrrhizate or monoammonium glycyrrhizate. Particularly preferred examples of a salt of glycyrrhizic acid or a derivative thereof used in the cosmetic of the present invention include dipotassium glycyrrhizate. The glycyrrhizic acid or a derivative thereof, or a salt thereof, used in the cosmetic of the present invention is expected to have an anti-inflammatory or anti-allergic action, sensitive skin symptoms improving action, and discomfort (stinging) inhibiting action during cosmetic application.

Examples of the nicotinic acid derivative used in the cosmetic of the present invention include a nicotinic acid amide or a nicotinic acid ester. Examples of the nicotinic acid ester include tocopherol nicotinate, benzyl nicotinate, methyl nicotinate, and ethyl nicotinate. Particularly preferred examples of the nicotinic acid derivative used in the cosmetic of the present application include a nicotinic acid amide. The nicotinic acid or a derivative thereof, or a salt thereof, used in the cosmetic of the present invention is expected to have an anti-inflammatory or wrinkle improving action, hyperpigmentation inhibiting action, barrier function improving action, moisturizing action, and rough skin improving action.

Examples of the tranexamic acid or a derivative thereof, or a salt thereof, used in the cosmetic of the present invention include tranexamic acid, dimers (trans-4-(trans-4-aminomethylcyclohexanecarbonyl)aminomethylcyclohexane carboxylate hydrochloride) of tranexamic acid, esters (trans-4-aminomethylcyclohexane carboxylate 4'-hydroxyphenyl ester) of tranexamic acid and hydroquinone, esters (2-(trans-4-aminomethylcyclohexylcarbonyloxy)-5-hydroxybenzoic acid and salts thereof) of tranexamic acid and gentisic acid, amides (trans-4-aminomethylcyclohexane carboxylate methylamide and salts thereof, trans-4-acetylaminomethylcyclohexane carboxylic acid and salts thereof, trans-4-(p-methoxybenzoyl)aminomethylcyclohexane carboxylic acid and salts thereof, trans-4-guanidinometylcyclohexane carboxylic acid and salts thereof) of tranexamic acid. For more details on tranexamic acid and derivatives thereof, refer to Japanese Unexamined Patent Publication (Kokai) No. 10-265321. Particularly preferred examples of tranexamic acid or a derivative thereof, or a salt thereof, include tranexamic acid. The tranexamic acid or a derivative thereof, or a salt thereof, used in the cosmetic of the present invention is expected to have an anti-inflammatory action, melanin production inhibiting action, whitening action (inhibition of spots, freckles, and chloasma), and hemostatic action.

Examples of the salicylic acid or a derivative thereof, or a salt thereof, used in the cosmetic of the present invention include 4-methoxysalicylic acid or a salt thereof. Particularly preferred examples of a salt of a salicylic acid derivative used in the cosmetic of the present invention include potassium 4-methoxysalicylate. The salicylic acid or a derivative thereof, or a salt thereof, used in the cosmetic of the present invention is expected to have an anti-inflammatory action, melanin production inhibiting action, melanin excretion accelerating action, and whitening action (inhibition of spots, freckles, and chloasma).

Examples of the drug used in the cosmetic of the present invention include a carboxylic acid represented by formula (I) or a salt thereof. Particularly preferred examples of the carboxylic acid used in the cosmetic of the present invention include 1-piperidine propionic acid. The carboxylic acid represented by the formula (I) or a salt thereof used in the cosmetic of the present invention is expected to have a skin aging improving action, rough skin inhibiting action, rough skin improving action, and wrinkle improving action.

The content of the drug in the cosmetic of the present invention is not particularly limited as long as the wavelength conversion effect of the UV wavelength conversion substance of the present invention is not impaired. The content can be appropriately determined in accordance with the type of drug or the application of the cosmetic containing the drug. The range thereof is not limited and may be, for example, 0.001 to 30% by weight, 0.01 to 20% by weight, 0.01 to 10% by weight, 0.01 to 5% by weight, 0.05 to 20% by weight, 0.05 to 10% by weight, or 0.05% to 5% by weight.

As one aspect of the present invention, the drug in the cosmetic contains dipotassium glycyrrhizate. Preferably, the content of dipotassium glycyrrhizate in the cosmetic of the present invention relative to the total of the cosmetic is 0.002% by weight or more, preferably 0.01% by mass or more, more preferably 0.02% by weight or more, or even more preferably 0.05% by weight or more, and 20% by weight or less, preferably 2% by weight or less, more preferably 1% by weight or less, or even more preferably 0.2% by weight or less. The content relative to the total of the cosmetic is 0.002 to 10% by weight, 0.01 to 2% by weight, 0.02 to 2% by weight, 0.02 to 1% by weight, 0.02 to 0.8% by weight, 0.02 to 0.6% by weight, 0.02 to 0.4% by weight, or 0.02 to 0.2% by weight.

As one aspect of the present invention, the drug in the cosmetic contains a nicotinic acid amide. The content of the nicotinic acid amide in the cosmetic of the present invention relative to the total of the cosmetic is 0.2% by weight or more, preferably 1% by mass or more, more preferably 2% by weight or more, or even more preferably 5% by weight or more, and 50% by weight or less, preferably 20% by weight or less, more preferably 10% by weight or less, or even more preferably 5% by weight or less. The content relative to the total of the cosmetic is 0.1 to 50% by weight, 0.1 to 20% by weight, 0.1 to 10% by weight, 0.1 to 5% by weight, 0.5 to 20% by weight, 0.5 to 10% by weight, 1 to 20% by weight, or 5 to 20% by weight.

As one aspect of the present invention, the drug in the cosmetic contains tranexamic acid. Preferably, the content of tranexamic acid in the cosmetic of the present invention relative to the total of the cosmetic is 0.1% by weight or more, preferably 0.5% by mass or more, more preferably 1% by weight or more, or even more preferably 2% by weight or more, and 20% by weight or less, preferably 10% by weight or less, more preferably 5% by weight or less, or even more preferably 2% by weight or less. The content relative to the total of the cosmetic is 0.1 to 20% by weight, 0.1 to 10% by weight, 0.1 to 5% by weight, 0.1 to 2% by weight, 0.5 to 20% by weight, 0.5 to 10% by weight, 1 to 20% by weight, or 2 to 20% by weight.

As one aspect of the present invention, the drug in the cosmetic contains potassium 4-methoxysalicylate. Preferably, the content of potassium 4-methoxysalicylate in the cosmetic of the present invention relative to the total of the cosmetic is 0.05% by weight or more, preferably 0.1% by mass or more, more preferably 0.5% by weight or more, or even more preferably 1% by weight or more, and 20% by weight or less, preferably 10% by weight or less, more preferably 5% by weight or less, or even more preferably 2% by weight or less. The content relative to the total of the cosmetic is 0.05 to 20% by weight, 0.05 to 10% by weight, 0.05 to 5% by weight, 0.1 to 20% by weight, 0.1 to 10% by weight, 0.5 to 20% by weight, 0.5 to 10% by weight, or 0.5 to 10% by weight.

As one aspect of the present invention, the drug in the cosmetic contains 1-piperidine propionic acid. Preferably, the content of 1-piperidine propionic acid in the cosmetic of the present invention relative to the total of the cosmetic is 0.1% by weight or more, preferably 0.5% by mass or more, more preferably 1% by weight or more, or even more preferably 2% by weight or more, and 20% by weight or less, preferably 10% by weight or less, more preferably 5% by weight or less, or even more preferably 2% by weight or less. The content relative to the total of the cosmetic is 0.1 to 20% by weight, 0.1 to 10% by weight, 0.1 to 5% by weight, 0.1 to 2% by weight, 0.5 to 20% by weight, 0.5 to 10% by weight, 1 to 20% by weight, or 2 to 20% by weight.

As one aspect of the present invention, the drug in the cosmetic contains one or a combination of two or more drugs selected from the group of glycyrrhizic acid and a derivative thereof, nicotinic acid and a nicotinic acid derivative, tranexamic acid and a derivative thereof, salicylic acid and a derivative thereof, and a carboxylic acid represented by formula (I), and salts thereof. As one aspect of the present invention, the drug contains, for example, one or a combination of two or more selected from the group of glycyrrhizic acid or a derivative thereof or a salt thereof, nicotinic acid or a nicotinic acid derivative or a salt thereof, tranexamic acid or a derivative thereof or a salt thereof, salicylic acid or a derivative thereof or a salt thereof, and a carboxylic acid represented by the formula (I), or a salt thereof one or a combination of two or more selected from the group of nicotinic acid or a nicotinic acid derivative or a salt thereof, tranexamic acid or a derivative thereof or a salt thereof, salicylic acid or a derivative thereof or a salt thereof, and a carboxylic acid represented by the formula (I) or a salt thereof; one or a combination of two or more selected from the group of tranexamic acid or a derivative thereof or a salt thereof, salicylic acid or a derivative thereof or a salt thereof, and a carboxylic acid represented by the formula (I) or a salt thereof; or salicylic acid or a derivative thereof or a salt thereof, and/or a carboxylic acid represented by the formula (I) or a salt thereof.

As one aspect of the present invention, the drug in the cosmetic contains one or a combination of two or more drugs selected from the group of dipotassium glycyrrhizinate, a nicotinic acid amide, tranexamic acid, potassium 4-methoxysalicylate, and 1-piperidine propionic acid.

As one aspect of the present invention, the drug contains, for example, one or a combination of two or more selected from the group of dipotassium glycyrrhizinate, a nicotinic acid amide, tranexamic acid, potassium 4-methoxysalicylate, and 1-piperidine propionic acid; one or a combination of two or more selected from the group of a nicotinic acid amide, tranexamic acid, potassium 4-methoxysalicylate, and 1-piperidine propionic acid; one or a combination of two or more selected from the group of tranexamic acid, potassium 4-methoxysalicylate, and 1-piperidine propionic acid; or potassium 4-methoxysalicylate and/or 1-piperidine propionic acid.

One aspect of the cosmetic of the present invention is a cosmetic containing (A') one or more substances selected from the group of phycobiliproteins such as phycocyanin, phycoerythrocyanin, and phycoerythrin; natural or synthetic components such as vitamin A, (β-carotene, vitamin K, vitamin B1, vitamin B2, vitamin B6, vitamin B12, folic acid, lycopene, gardenia, safflower, turmeric, cochineal, perilla, red cabbage, flavonoid, carotenoid, quinoid, porphyrins, anthocyanins, and polyphenols; Red No. 401, Red No. 227, Red No. 504, Red No. 218, Orange No. 205P, Yellow No. 4, Yellow No. 5, Green No. 201, pyranine conc., Blue No. 1, 2,4-diaminophenoxyethanol hydrochloride, Alizuline Purple SS, Purple No. 401, Black No. 401, Helindon Pink, Yellow No. 401, Benzidine Yellow G, Blue No. 404, Red No. 104, meta-aminophenol, a zinc oxide phosphor, and a magnesium titanate phosphor, and (B) one or more drugs selected from the group of glycyrrhizic acid and a derivative thereof, nicotinic acid and a derivative thereof, tranexamic acid and a derivative thereof, salicylic acid and a derivative thereof, and a carboxylic acid represented by the formula (I), and salts thereof.

One aspect of the cosmetic of the present invention is a cosmetic containing
(A') one or more substances selected from the group of phycocyanin, phycoerythrocyanin, phycoerythrin; vitamin A, β-carotene, vitamin K, vitamin B1, vitamin B2, vitamin B6, vitamin B12, folic acid, lycopene, gardenia, safflower color, turmeric, cochineal, perilla, red cabbage, flavonoid, carotenoid, quinoid, porphyrins, anthocyanins, polyphenols; Red No. 401, Red No. 227, Red No. 504, Red No. 218, Orange No. 205P, Yellow No. 4, Yellow No. 5, Green No. 201, pyranine conc., Blue No. 1, 2,4-diaminophenoxyethanol hydrochloride, Alizuline Purple SS, Purple No. 401, Black No. 401, Helindon Pink, Yellow No. 401, Benzidine Yellow G, Blue No. 404, Red No. 104, meta-aminophenol, a zinc oxide phosphor, and a magnesium titanate phosphor, and
(B) one or more drugs selected from the group of glycyrrhizic acid and a derivative thereof, nicotinic acid and a derivative thereof, tranexamic acid and a derivative thereof, salicylic acid and a derivative thereof, and a carboxylic acid represented by the formula (I), and salts thereof.

One aspect of the cosmetic of the present invention is a cosmetic containing
(A') one or more substances selected from the group of allophycocyanin, C-phycocyanin, R-phycocyanin, phycoerythrocyanin, B-phycoerythrin, b-phycoerythrin, C-phycoerythrin, R-phycoerythrin; vitamin A, β-carotene, vitamin K, vitamin B1, vitamin B2, vitamin B6, vitamin B12, folic acid, lycopene, gardenia, safflower, turmeric, cochineal, perilla, red cabbage, flavonoid, carotenoid, quinoid, porphyrins, anthocyanins, polyphenols; Red No. 401, Red No. 227, Red No. 504, Red No. 218, Orange No. 205P, Yellow No. 4, Yellow No. 5, Green No. 201, pyranine conc., Blue No. 1, 2,4-diaminophenoxyethanol hydrochloride, Alizuline Purple SS, Purple No. 401, Black No. 401, Helindon Pink, Yellow No. 401, Benzidine Yellow G, Blue No. 404, Red No. 104, and meta-aminophenol, and
(B) one or more drugs selected from the group of dipotassium glycyrrhizinate, a nicotinic acid amide, tranexamic acid, potassium 4-methoxysalicylate, and 1-piperidine propionic acid.

Oil Content

The cosmetic of the present invention may contain an oil content. The phrase "oil content" refers to a hydrophobic substance that phase-separates from water, which is a component of the cosmetic of the present invention. The oil content that can be used in the present invention is not particularly limited and contains one or more of, for example, hydrocarbon oils, ester oils, silicone oils, liquid oils, solid fats, and higher alcohols.

Examples of the hydrocarbon oils include liquid paraffin, tetraisobutane, hydrogenated polydecene, olefin oligomer, isododecane, isohexadecane, squalane, and hydrogenated polyisobutene.

Examples of the ester oils include diisopropyl sebacate (Eceran 200 manufactured by Nippon Fine Chemical Co., Ltd.), octyl palmitate, cetyl isooctanoate (cetyl 2-ethylhexanoate), triethylhexanoin, neopentyl glycol dicaprate, triisostearin, diisostearyl malate, PPG-3 dipivalate, di-2-ethylhexyl succinate, 2-ethylhexyl 2-ethylhexanoate, polyglyceryl-6 octacaprylate, and glyceryl tri(caprylate/caprate).

Examples of the silicone oils include caprylyl methicone (SS-3408 manufactured by Dow Chemical Company), dimethicone (BELSIL DM 1 Plus manufactured by Asahi Kasei Wacker Silicone Co., Ltd.), amino-modified polysiloxane, polyether-modified polysiloxane, alkyl-modified polysiloxane, and fluorine-modified polysiloxane.

Examples of the liquid oils include avocado oil, *camellia* oil, macadamia nut oil, mink oil, olive oil, castor oil, jojoba oil, triglycerol, glycerol trioctanoate, and isostearic acid.

Examples of the solid fats include coconut oil, hardened coconut oil, palm oil, beef tallow, mutton tallow, Japan wax, and hardened castor oil.

Examples of the higher alcohols include isostearyl alcohol, oleyl alcohol, and an interpolymer of butylene glycol and propylene glycol (for example, PBG/PPG-9/1 copolymer (UNIOL PB-700 manufactured by NOF Corporation)).

(Other Components)

Various components can be appropriately blended in the cosmetic of the present invention as long as the effect of the present invention is not impaired. Examples of the various components include additive components that can be blended generally in cosmetics, such as clay minerals (dimethyldistearylammonium hectorite), powders (polymethyl methacrylate, crosslinked silicone/network-type silicone block interpolymer, silica, hydrophobized talc, cornstarch, hydrophobized polyurethane), chelating agents (disodium edetate hydrate), fragrances, moisturizing agents (glycerin, dipropylene glycol), preservatives, oil-phase solidifiers (sucrose tetrastearate triacetate, dextrin palmitate, palmitic acid, glyceryl (behenate/eicosanedioate), N-lauroyl-L-glutamic acid dibutylamide, polyamide-8), anionic surfactants, cationic surfactants, amphoteric surfactants, nonionic surfactants, moisturizing agents, water-soluble polymers, silicone-modified polysaccharides, other film-forming agents, metal ion sequestering agents, lower alcohols, polyhydric alcohols, various extracts, sugars, amino acids, organic amines, polymer emulsions, pH adjusters, skin nutrients, vitamins, pharmaceuticals, quasi-drugs, water-soluble drugs other than ones describe above that are applicable to cosmetics, antioxidants, buffering agents, antioxidant aids, injection agents, organic powders, pigments, dyes, colors, water, acid components, and alkaline components. These optional components can be appropriately blended in an oil phase or a water phase. Further, another cell activating agent may be contained or co-used to enhance the effect of the present invention.

The cosmetic of the present invention can be produced by a conventional method.

Specifically, the cosmetic of the present embodiment is obtained in accordance with the following procedure: Component (A) or (A') and component (B) are stirred with water, and other components are added as appropriate and stirred to thereby obtain a cosmetic.

The formulation form of the cosmetic of the present invention may be a lotion, a cosmetic cream, or a cosmetic emulsion. The cosmetic of the present invention can be applied to skin including the scalp. In the cosmetic of the present invention, effects such as prevention of or improvement from wrinkles, spots, skin aging, and photoaging, as well as improvement in hair tension and elasticity, inhibition of hair loss, and promotion of hair growth, by the activation of skin cells can be expected. Further, the cosmetic of the present invention contains a drug, and is thus effective for rough skin, improvement from wrinkles, and whitening.

EXAMPLES

The present invention will be described in more detail with reference to the following Examples. Note that the present invention is not limited thereto.

Example 1

Experiment 1: Cell Activation Effects of Various UV Wavelength Conversion Substances Experiment 1-1: Preparation of UV Wavelength Conversion Substance A UV wavelength conversion substance was prepared as follows:
(1) B-phycoerythrin
B-phycoerythrin was obtained from Porphyridium cruentum extract. The absorption spectrum thereof had a peak wavelength of 305 nm, and the emission spectrum thereof had peak wavelengths of 570 nm and 610 nm.
(2) C-phycocyanin
C-phycocyanin was obtained from Spirulina platensis extract. The absorption spectrum thereof had a peak wavelength of 350 nm, and the emission spectrum thereof had peak wavelengths of 640 nm and 700 nm. Linablue by DIC Corp. was used.
(3) Zinc oxide phosphor
Lumate G by Sakai Chemical Industry Co., Ltd. was used. Lumate G is a zinc oxide phosphor of ZnO doped with a sulfur-containing compound, as described in WO 2018/004006. The absorption spectrum thereof had a peak wavelength of 365 nm, and the emission spectrum thereof had a peak wavelength of 510 nm.
(4) Magnesium titanate phosphor
Lumate R by Sakai Chemical Industry Co., Ltd. was used. Lumate R is a magnesium titanate phosphor of $MgTiO_3$ doped with manganese. The absorption spectrum thereof had a peak wavelength of 365 nm, and the emission spectrum thereof had a peak wavelength within a zone of 660 to 680 nm.

The UV wavelength conversion substances (1) and (2) were dissolved in water to prepare solutions having a concentration of 1% or 5%.

The UV wavelength conversion substances (3) and (4) were dispersed in alcohol to prepare 5% and 10% dispersions.

Experiment 1-2: Preparation of Cell Sample

A cell sample was prepared as follows:
1. Human dermal fibroblasts and human skin keratinocytes purchased from Kurabo Industries Ltd. were used. A cell suspension (1 mL) stored in liquid nitrogen was thawed in a water bath (37° C.) to an extent that small ice pellets remained, and then diluted with 9 mL of warm medium.
2. The diluted suspension was mixed gently and then transferred to a T75 flask and incubated overnight at 37° C.
3. The next day, the medium was replaced with 10 mL of fresh medium.
4. The medium was replaced periodically (once every 2 days for fibroblasts and once every 2 to 3 days for keratinocytes) and cell proliferation was continued. Meanwhile, the cells were observed using a microscope, and it was confirmed that the cells grew in the correct form.
5. After the cells reached about 80% confluence, the cells were passaged. The cells were passaged by washing the cells once with 10 mL of warm PBS, adding 5 mL of warm trypsin to a T75 flask, covering the bottom of the flask with a trypsin solution, followed by aspirating at room temperature for 1 minute.
6. The flask was allowed to stand in an oven at 37° C. for (maximum) 2 minutes for fibroblasts and (maximum) 7 minutes for keratinocytes. The cells were observed using a microscope and confirmed to be small and oval.
7. Thereafter, the side of the T75 flask was lightly tapped to release the cells. The cells were observed using a microscope and confirmed to be moving freely.
8. Fibroblasts were resuspended in 5 mL warm FGM (containing 10% serum) and transferred to a sterile 50 mL Falcon tube. An additional 5 mL of warm FGM was used to flush the flask and added to the Falcon tube to ensure transfer of all cells.
9. The cells were centrifuged at 10,000 rpm for 5 minutes (4° C.) and the supernatant was removed taking care not to disturb the pellet of cells.
10. Depending on the cell type, fibroblasts were resuspended in FGM or KGM at a concentration of $2\times10^4$ cells/well (500 µL), and keratinocytes were resuspended in FGM or KGM at a concentration of $4\times10^4$ cells/well (500 µL) and plated 24-well plates.
11. Cells were seeded in 24-well plates and the media were changed periodically (once every 2 days for fibroblasts and once every 2 to 3 days for keratinocytes) and the cells were grown until 60 to 70% confluence (depending on the type of experiment) was reached. (Note: Fibroblasts should reach the desired confluency in 24 hours at a cell density of $2\times10^4$ cells/well. When the cell density is low, for example, $1\times10^4$ cells/well, it takes 48 hours for fibroblasts to reach the desired confluency.)
12. 24 hours before irradiation, the medium was changed to a supplement-free medium (in the case of keratinocytes) or a medium containing a low concentration of serum (0.5% FCS) (in the case of fibroblasts).

Experiment 1-3: Ultraviolet Irradiation

1. A solar simulator was turned on at least 30 minutes before irradiation to warm up a lamp. The solar simulator was set to use a UG11 filter. UG11 filters are filters that allow only UVB to pass and cut light of other wavelengths. The UV light passed through the UG11 filter had a peak wavelength of 300 nm to 385 nm.
2. A temperature control plate was turned on and set to 33° C.
3. The cells prepared in Experiment 1-2 were washed once with warm PBS.
4. To each well was added 0.5 mL of a warmed Martinez solution (145 mM NaCl, 5.5 mM KCl, 1.2 mM $MgCl_2.6H_2O$, 1.2 mM $NaH_2PO_4.2H_2O$, 7.5 mM HEPES, 1 mM $CaCl_2$, and 10 mM D-glucose).
5. As depicted in FIG. 1, cell wells were placed on a plate. Then, 0.4 ml of a solution containing the UV wavelength conversion substances (1) to (4) prepared in Experiment 1-1 was injected into each well of a 24-well plate. The wells containing cells were placed to be covered, such that the cell solution was irradiated with UV light through the solution of the UV wavelength conversion substances without direct contact between the UV wavelength conversion substance solution and the cell solution.
6. Irradiation was carried out to a total dose of 100 $mJ/cm^2$. Further, as controls, there were prepared a sample of cells irradiated directly with UV light without placing a plate of a UV wavelength conversion substance on cell wells and a sample of cells cultured in the dark without irradiation with UV light.
7. After irradiation, the Martinez was replaced with warm KGM (without supplements) or FGM (containing 0.5% FCS) and the plate was returned to the incubator at 37° C.

Experiment 1-4: Measurement of Cell Activity

After the completion of Experiment 1-3, the cells maintained in the incubator for 48 hours were used to measure the activity by the following method:
1. A medium (KGM medium without supplements or 0.5% FCS-containing FGM medium) was supplemented with 10% AlamarBlue and warmed to 37° C. (the solution was maintained in the dark).
2. The medium in the wells was replaced with 500 µL of the above 10% AlamarBlue solution, and the plate was returned to the incubator at 37° C. for about 3 hours. Control wells were also maintained in the incubator. These solutions were maintained in the dark to protect them from light.
3. After 3 hours, 100 µL aliquots were collected and transferred to a black 96-well plate.
4. Fluorescence measurement values at 544 nm/590 nm were read using a fluorometer (OPwave+, Ocean Photonics).

Figure 2:
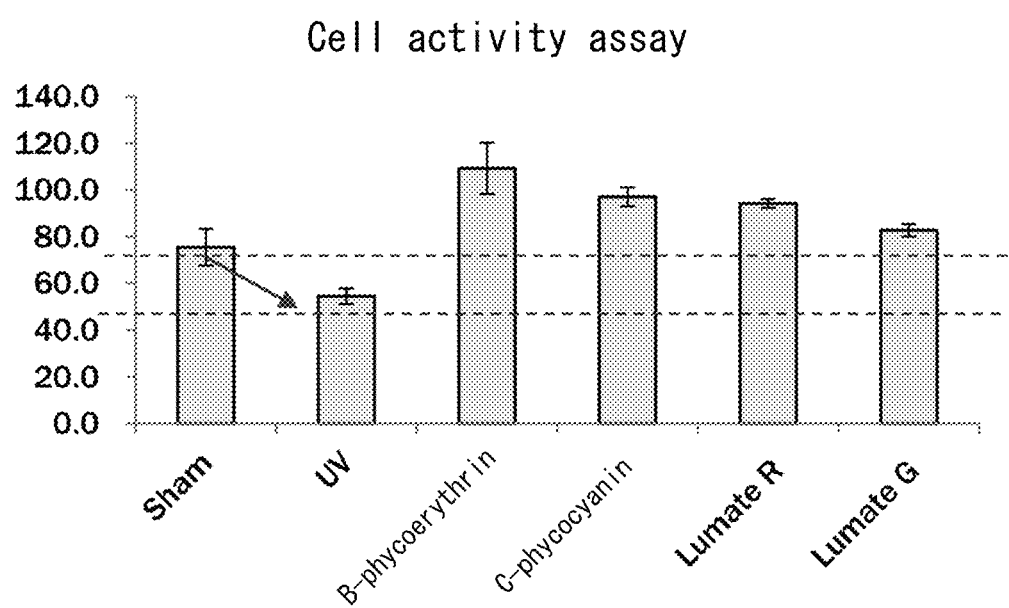
FIG. 2 shows the cell activity at UV irradiation using each ultraviolet in Experiment 1. The vertical axis indicates relative fluorescence intensity (au).

The results are shown in FIG. 2. UV irradiation reduced cell activity compared to the control without irradiation. However, the activity of cells irradiated with UV through any UV wavelength conversion substance was increased compared to the control without irradiation. From the above results, it was found that although the cell activity was decreased by UV irradiation, the decrease in cell activity is inhibited using a UV wavelength conversion substance.

Example 2: Influence of Concentration of UV Wavelength Conversion Substance or Intensity of UV on Cell Activity The same method as in Experiment 1 was employed except that C-phycocyanin was used as the UV wavelength conversion substance, a cell culture was covered with a plate of a solution containing C-phycocyanin at 0%, 0.4%, or 2%, and irradiated with UV at a dose of 0, 10, 25, 50, 75, or 100 $mJ/cm^2$.

Figure 3:
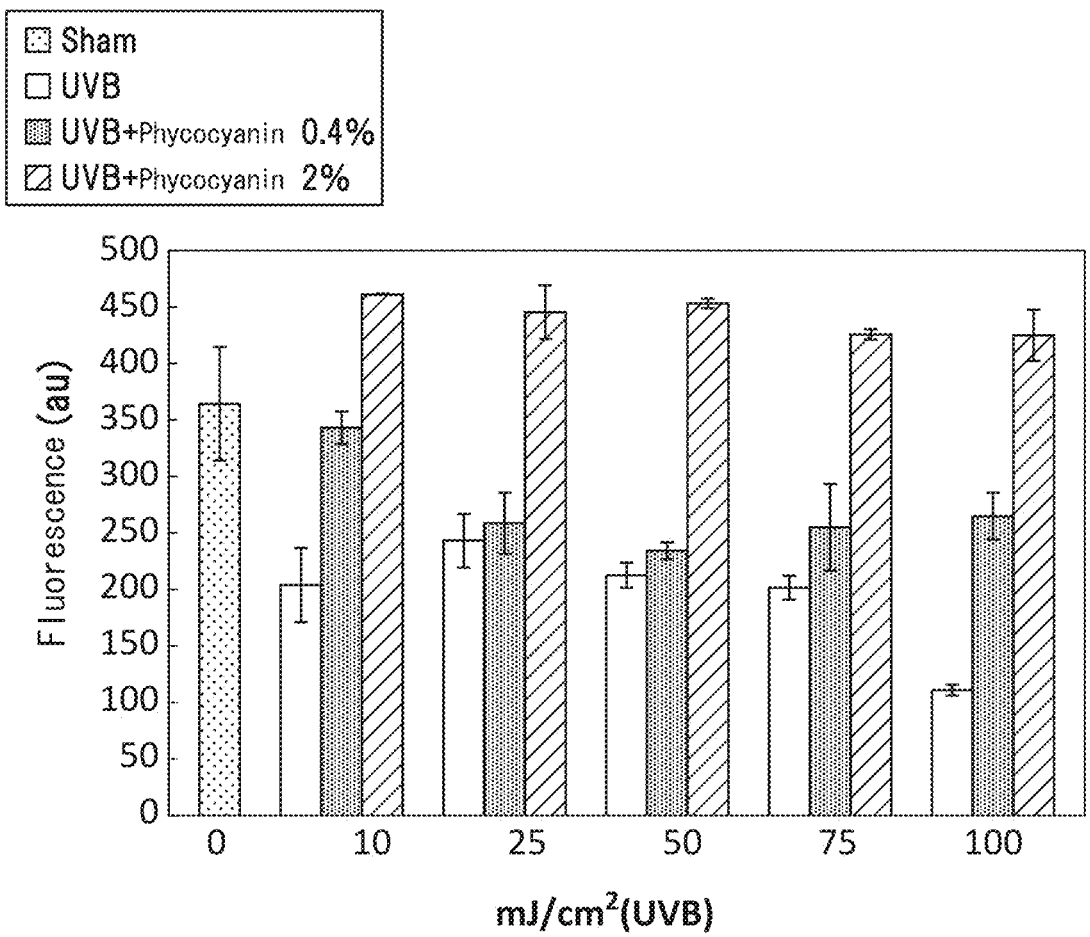
FIG. 3 shows the cell activity at UV irradiation of each intensity using C-phycocyanin in each concentration in Experiment 2 as the relative fluorescence intensity (au).

The results are shown in FIG. 3. When the UV wavelength conversion substance was not used, the cell activity decreased as the UV irradiation amount increased. However, when 0.4% C-phycocyanin was added, the decrease in cell activity was inhibited even when UV irradiation was carried out, and when 2% C-phycocyanin was added, the cell activity was even enhanced compared to the case where UV irradiation was not carried out. From the above results, it was found that although the cell activity was decreased by UV irradiation, the use of a UV wavelength conversion substance not only inhibited the decrease in cell activity in a concentration-dependent manner, but also enhanced the cell activity.

Example 3: Restoration of Cell Activity Decreased by UV Irradiation

Figure 4:
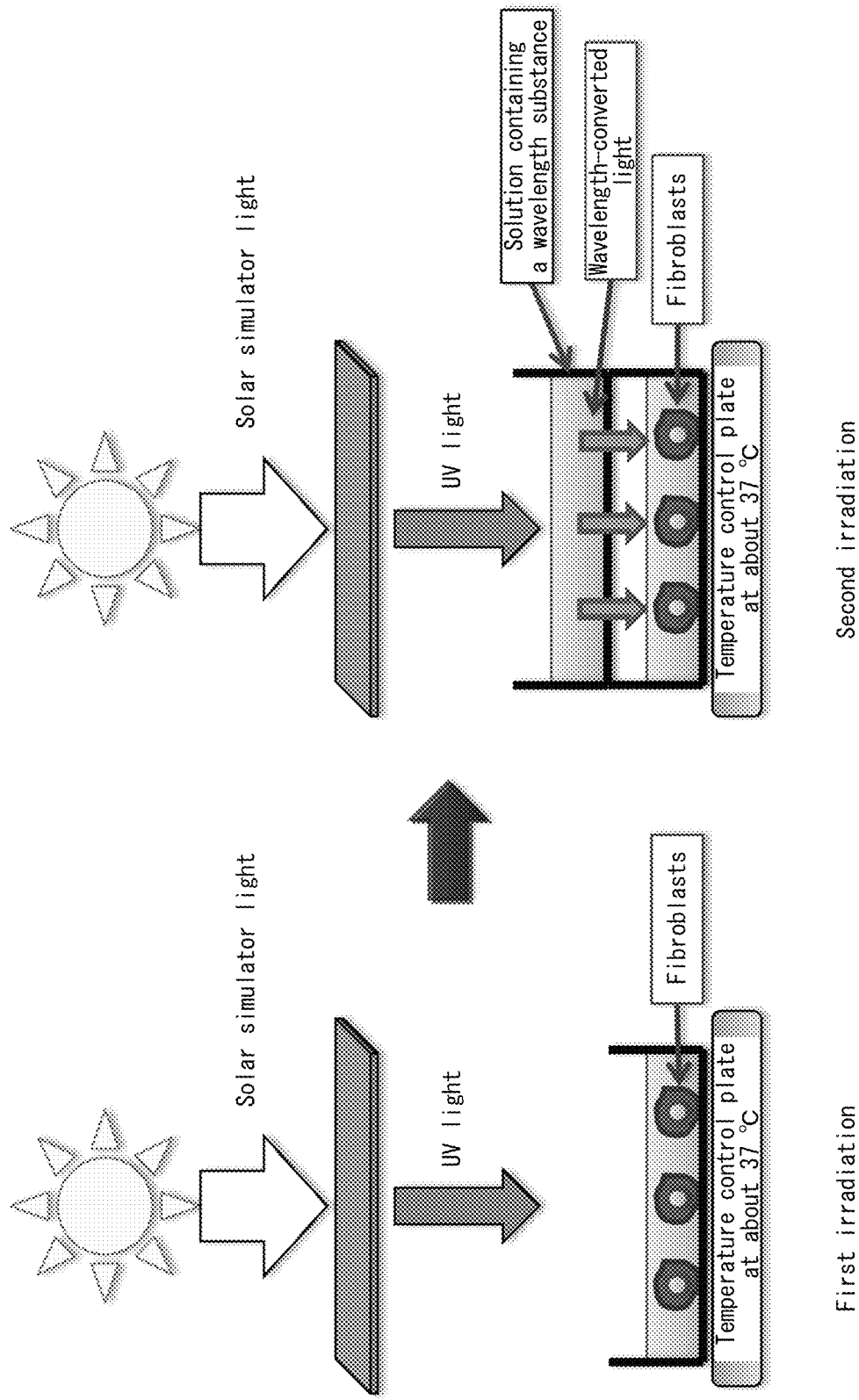
FIG. 4 is a schematic diagram of Experiment 3.

The same method as in Experiment 1 was employed except that as shown in FIG. 4, UV irradiation was carried out without using a UV wavelength conversion substance until the irradiation amount reached 400 $mJ/cm^2$ to once decrease the cell activity, and a cell culture was covered with a plate of a solution containing C-phycocyanin as the UV wavelength conversion substance at 0%, 0.4%, or 2%, and irradiated with UV at a dose of 0, 10, 25, 50, 75, 100, or 200 mJ/cm$^2$.

The results are shown in FIG. 5. It can be seen that cell activity was recovered by subjecting even cells having once decreased activity by UV irradiation without using a UV wavelength conversion substance to UV irradiation using a UV wavelength conversion substance. This effect of C-phycocyanin was equivalent at concentrations of 0.4% and 2%, suggesting a sufficient cell activation effect at 0.4%. On the other hand, when UV irradiation was carried out without using a UV wavelength conversion substance, the cell activity decreased in a UV dose-dependent manner.

The results for human dermal fibroblasts are described above. Similar results were also observed for keratinocytes (data not shown). From these results, it was found that a UV wavelength conversion substance not only inhibited a decrease in cell activity due to UV irradiation, but also has an effect of activating cells using UV light. When skin cells are activated, prevention of and improvement from wrinkles, spots, skin aging, photoaging, etc. are expected.

From Examples 1 to 3 above, it was considered that a UV wavelength conversion substance converts the wavelength of ultraviolet, and emitted visible light (fluorescence having a main wavelength of 500 nm to 700 nm) activates skin cells such as fibroblasts and corneocytes. Thus, various cosmetics containing a UV wavelength conversion substance were produced, and the amount of fluorescence emitted during ultraviolet irradiation was evaluated.

For fluorescence measurement, the composition was applied to an S plate (refer to Japanese Registered Patent Publication No. 4453995) at 1 mg/cm$^2$ and dried to prepare a coating film of the composition. The obtained coating film was irradiated with ultraviolet having a predetermined wavelength, and a fluorescence integrated value in a predetermined wavelength region was measured using an RF-5300PC (Shimadzu Corporation) fluorescence spectrophotometer. When the UV wavelength conversion substance was a zinc oxide phosphor, a coating film was irradiated with ultraviolet at 365 nm, and the fluorescence integrated value of 400 to 600 nm was measured in the same manner. When the UV wavelength conversion substance was C-phycocyanin, a coating film was irradiated with ultraviolet light at 350 nm, and fluorescence integrated values at 550 to 800 nm were measured in the same manner. When the UV wavelength conversion substance was vitamin B2, a coating film was irradiated with ultraviolet at 270 nm, and the fluorescence integrated value at 400 to 750 nm was measured in the same manner.

Example 4: Effect of Drug on UV Wavelength Conversion Function (Zinc Oxide Phosphor)

Cosmetics (Formulation Examples G0 to G5) shown in Table 1 were produced according to a conventional production process. Formulation Example G0 (Comparative Example) did not contain a drug. Formulation Examples G1 to G5 contained various drugs. All Formulation Examples contained a zinc oxide phosphor as the UV wavelength conversion substance. Coating films of the obtained cosmetics were irradiated with ultraviolet at 365 nm, and fluorescence integrated values at wavelengths of 400 to 600 nm were measured.

When the fluorescence integrated value of the Comparative Example was set as 100%, the fluorescence integrated values of Formulation Examples 1 to 5 were 235, 201, 362, 244, and 396%, respectively. Although the effects differ depending on the drug, the investigated drugs all enhanced the wavelength conversion function of the zinc oxide phosphor.

TABLE 1

| | Formulation composition | Formulation Example G0 | Formulation Example G1 | Formulation Example G2 | Formulation Example G3 | Formulation Example G4 | Formulation Example G5 |
|---|---|---|---|---|---|---|---|
| Water | ion-exchanged water | | | Total amount of 100 with water | | | |
| Phosphor | zinc oxide phosphor | 1 | 1 | 1 | 1 | 1 | 1 |
| Drug | dipotassium glycyrrhizinate | | 0.05 | | | | |
| | nicotinic acid amide | | | 5 | | | |
| | tranexamic acid | | | | 2 | | |
| | potassium 4-methoxysalicylate | | | | | 1 | |
| | piperidine propionic acid | | | | | | 2 |
| Alcohol | ethanol | 5 | 5 | 5 | 5 | 5 | 5 |
| Moisturizing agent | glycerin | 5 | 5 | 5 | 5 | 5 | 5 |
| | dipropylene glycol | 5 | 5 | 5 | 5 | 5 | 5 |
| pH adjuster | citric acid | q.s. | q.s. | q.s. | q.s. | q.s. | q.s. |
| | sodium citrate | q.s. | q.s. | q.s. | q.s. | q.s. | q.s. |
| Chelating agent | disodium edetate | q.s. | q.s. | q.s. | q.s. | q.s. | q.s. |
| Preservative | phenoxyethanol | q.s. | q.s. | q.s. | q.s. | q.s. | q.s. |
| | Fluorescence integrated value (%) | 100 | 235 | 201 | 362 | 244 | 396 |

Example 5: Effect of Drug on UV Wavelength Conversion Function (Phycocyanin)

Cosmetics (Formulation Examples P0 to P5) shown in Table 1 were produced according to a conventional production process. Formulation Example P0 (Comparative Example) did not contain a drug. Formulation Examples P1 to P5 contained various drugs. All Formulation Examples contained C-phycocyanin as the UV wavelength conversion substance. Coating films of the obtained cosmetics were irradiated with ultraviolet at 350 nm, and fluorescence integrated values at wavelengths of 550 to 800 nm were measured.

When the fluorescence integrated value of the Comparative Example was set as 100%, the fluorescence integrated values of Formulation Examples P1 to P5 were 152, 199, 204, 193, and 248%, respectively. Although the effects differ depending on the drug, the investigated drugs all enhanced the wavelength conversion function of the phycocyanin.

TABLE 2

| | Formulation composition | Formulation Example P0 | Formulation Example P1 | Formulation Example P2 | Formulation Example P3 | Formulation Example P4 | Formulation Example P5 |
|---|---|---|---|---|---|---|---|
| Water | ion-exchanged water | | | Total amount of 100 with water | | | |
| Phosphor | C-phycocyanin | 0.1 | 0.1 | 0.1 | 0.1 | 0.1 | 0.1 |
| Drug | dipotassium glycyrrhizinate | | 0.05 | | | | |
| | nicotinic acid amide | | | 5 | | | |
| | tranexamic acid | | | | 2 | | |
| | potassium 4-methoxysalicylate | | | | | 1 | |
| | piperidine propionic acid | | | | | | 2 |
| Alcohol | ethanol | 5 | 5 | 5 | 5 | 5 | 5 |
| Moisturizing agent | glycerin | 5 | 5 | 5 | 5 | 5 | 5 |
| | dipropylene glycol | 5 | 5 | 5 | 5 | 5 | 5 |
| pH adjuster | citric acid | q.s. | q.s. | q.s. | q.s. | q.s. | q.s. |
| | sodium citrate | q.s. | q.s. | q.s. | q.s. | q.s. | q.s. |
| Chelating agent | disodium edetate | q.s. | q.s. | q.s. | q.s. | q.s. | q.s. |
| Preservative | phenoxyethanol | q.s. | q.s. | q.s. | q.s. | q.s. | q.s. |
| | Fluorescence integrated value (%) | 100 | 152 | 199 | 204 | 193 | 248 |

Example 6: Effect of Drug on UV Wavelength Conversion Function (Vitamin B2)

Cosmetics (Formulation Examples 0 to 5) shown in Table 1 were produced according to a conventional production process. Formulation Example V0 (Comparative Example) did not contain a drug. Formulation Examples V1 to V5 contained various drugs. All Formulation Examples contained vitamin B2 (riboflavin) as the UV wavelength conversion substance. Coating films of the obtained cosmetics were irradiated with ultraviolet at 270 nm, and fluorescence integrated values at wavelengths of 400 to 750 nm were measured.

When the fluorescence integrated value of the Comparative Example was set as 100%, the fluorescence integrated values of Formulation Examples V1 to V5 were 180, 177, 176, 155, and 204%. Although the effects differ depending on the drug, the investigated drugs all enhanced the wavelength conversion function of the zinc oxide phosphor.

Example 7: Effect on Cytochrome c Content of Various Drugs

From the AlamarBlue assays in Examples 1 to 3, it was found that wavelength-converted visible light enhanced the reducing ability by electron acceptance from the mitochondrial respiratory chain in cells. Cytochrome c is a molecule involved in the electron transport system of mitochondria, and plays an important function in the production of NDH molecules, which are a reducing agent. Thus, whether the cosmetic of the present invention influences the intracellular concentration of cytochrome c in cells was investigated.

The cosmetic of the present invention was applied and dispensed at 0.25 g/well to a 24-well plate and dried. Human skin-derived fibroblasts (ScienCell Research Lab. #2320) were seeded on a 24-well plate at $1\times10^5$ cells/well and cultured in a DMEM medium (Thermo Fisher, #11965-092) for 3 days. After washing the cells with PBS, 1 mL of PBS was added. The 24-well plate containing the dried cosmetic was placed on a 24-well plate containing cells, and irradiated with artificial sunlight (Selic Corporation, XC-500BF) at a maximum output power for 40 minutes at a distance of about

TABLE 3

| | Formulation composition | Formulation Example V0 | Formulation Example V1 | Formulation Example V2 | Formulation Example V3 | Formulation Example V4 | Formulation Example V5 |
|---|---|---|---|---|---|---|---|
| Water | ion-exchanged water | | | Total amount of 100 with water | | | |
| Phosphor | riboflavin | 0.01 | 0.01 | 0.01 | 0.01 | 0.01 | 0.01 |
| Drug | dipotassium glycyrrhizinate | | 0.05 | | | | |
| | nicotinic acid amide | | | 5 | | | |
| | tranexamic acid | | | | 2 | | |
| | potassium 4-methoxysalicylate | | | | | 1 | |
| | piperidine propionic acid | | | | | | 2 |
| Alcohol | ethanol | 5 | 5 | 5 | 5 | 5 | 5 |
| Moisturizing agent | glycerin | 5 | 5 | 5 | 5 | 5 | 5 |
| | dipropylene glycol | 5 | 5 | 5 | 5 | 5 | 5 |
| pH adjuster | citric acid | q.s. | q.s. | q.s. | q.s. | q.s. | q.s. |
| | sodium citrate | q.s. | q.s. | q.s. | q.s. | q.s. | q.s. |
| Chelating agent | disodium edetate | q.s. | q.s. | q.s. | q.s. | q.s. | q.s. |
| Preservative | phenoxyethanol | q.s. | q.s. | q.s. | q.s. | q.s. | q.s. |
| | Fluorescence integrated value (%) | 100 | 180 | 177 | 176 | 155 | 204 |

70 cm apart. All the cell plates were placed on a heat storage material at 20° C. to prevent temperature rise. After the irradiation time elapsed, the PBS was removed, 0.3 mL of a cell-extract solution (RIPA buffer: 50 mM Tris-HCl (pH 8.0), 150 mM NaCl, 0.5% (w/v) Sodium Deoxycholate, 0.1% (w/v) SDS, 1.0% (w/v) NP-40 substitute, and 1 mM PMSF) was added, and the cells were completely lysed by pipetting. The lysate was centrifuged at 10,000×g for 10 minutes at 4° C., and cytochrome c in the supernatant was measured (Proteintech Group, Inc., KE00079).

There was no effect on the appearance of the cells before and after sunlight irradiation for any of the Formulation Examples. The content of cytochrome c in cells irradiated with sunlight through the cosmetic of the Comparative Example (Formulation Example G0) was 3939 pg/mL. The cytochrome c content of cells irradiated with sunlight through the cosmetic with dipotassium glycyrrhizinate or a nicotinic acid amide added thereto was increased, at 4666 pg/mL (Formulation Example G1) and 5298 pg/mL (Formulation Example G2), respectively. From the above results, it was considered that the investigated drugs increase the function of the UV wavelength conversion substance and activate cells by increasing the concentration of cytochrome c in cells and increasing the activity of mitochondria.

The cosmetic of the present invention is described above. However, the present invention is not limited thereto, and can be modified as appropriate without departing from the spirit of the invention.

The invention claimed is:

1. A cosmetic comprising
(A) a UV wavelength conversion substance and
(B) one or more drugs selected from the group consisting of a derivative of glycyrrhizic acid, a derivative of nicotinic acid, tranexamic acid, a derivative of salicylic acid, and a carboxylic acid represented by formula (I) below, and salts thereof,

[Chem. 1]

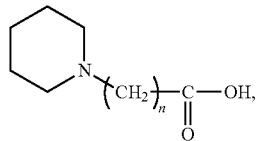

(I)

wherein n represents an integer of 2 to 5,
the (A) UV wavelength conversion substance comprises one or more selected from the group consisting of phycocyanin, vitamin B2, and a zinc oxide phosphor,
the derivative of glycyrrhizic acid comprises dipotassium glycyrrhizinate,
the derivative of the nicotinic acid comprises nicotinic acid amide,
the derivative of the salicylic acid comprises potassium 4-methoxysalicylate, and
the carboxylic acid represented by the formula (I) comprises 1-piperidine propionic acid.

2. The cosmetic according to claim 1, wherein the (A) UV wavelength conversion substance comprises a zinc oxide phosphor.

3. The cosmetic according to claim 1, wherein the (A) UV wavelength conversion substance comprises one or more selected from the group consisting of phycocyanin and vitamin B2.

4. The cosmetic according to claim 1, which is a lotion, a cosmetic cream, or a cosmetic emulsion.

5. The cosmetic according to claim 1, which exhibits a fluorescence intensity increasing effect.

6. The cosmetic according to claim 1, which exhibits a cell activation effect.

* * * * *